United States Patent Office 2,967,865
Patented Jan. 10, 1961

2,967,865

PIPERAZINIUM SALTS

Bernard Rudner, Pittsburgh, Pa., assignor to W. R. Grace & Co., New York, N.Y., a corporation of Connecticut No Drawing. Filed Sept. 16, 1958, Ser. No. 761,295

8 Claims. (Cl. 260—268)

This invention relates to quaternary nitrogenous salts. In one specific aspect, it relates to piperazinium salts which may be called N-aminopiperazinium compounds.

It is an object of the present invention to provide a new generic class of compounds having remarkable pharmacological properties.

The compounds of my invention are conveniently prepared by the action of chloramine on the appropriate tertiary amine. In the preferred practice of this invention, the reactant tertiary amine dissolved in an unreactive solvent is exposed to a stream of gaseous chloramine. The resultant N-aminopiperazinium chloride is isolated by conventional laboratory techniques. Compounds containing anions other than chloride are prepared by metathesis starting with the chloride and a compound containing the anion to be introduced.

In accordance with the present invention, I have made available a new class of piperazinium salts having the general formula:

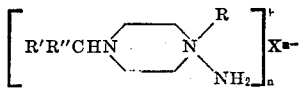

In the above formula, R may be lower alkyl, hydroxy lower alkyl or lower allylic alkenyl. By allylic I mean that the carbon atoms attached to the nitrogen does not bear the double bond. R' and R" may be phenyl or substituted phenyl. Suitable substituents on the benzene ring are halo, lower alkyl and lower alkoxy. X is an anion bearing the charge $n$; $n$ also represents the number of cations required to balance the anionic charge.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variations of the anion may in scme cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate and the like. Thus "$n$," the charge on the anion, is seen to be one, two or three.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., a U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like, ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and cellusolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analgous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The scope and utility of my invention is further illustrated by the following examples:

*Example I*

Twenty-seven grams of cyclizine, N'-benzhydryl-N-methylpiperazine, dissolved in 800 ml. of chloroform was treated with gaseous chloramine using the generator of Sisler et al. discussed above. Filtration gave 32.6 g. of a solid containing about 60% product and 40% ammonium chloride. Evaporation of the filtrate gave 9.1 g. additional crude product. The combined solids were purified by recrystallization from isopropyl alcohol after filtration from undissolved ammonium chloride. Pure N-amino-N-methyl-N'-benzhydrylpiperazinium chloride melted about 230° C. and analyzed: percent C, 67.3; percent H, 7.45; and percent N, 13.0. Calculated for $C_{18}H_{24}N_3Cl$: percent C, 68.0; percent H, 7.61; and percent N, 13.2.

*Examples II and III*

Separate aqueous solutions of N-amino-N-methyl-N'-benzhydrylpiperazinium chloride were treated with aqueous potassium hexafluorophosphate and a saturated aqueous solution of picric acid. The resultant precipitates were collected by filtration and dried. N-amino-N-methyl-N'-benzhydrylpiperazinium picrate melted about 174° C.; N-amino-N-methyl-N'-benzhydrylpiperazinium hexafluorophosphate melted about 194° C. The structure of the latter is given below:

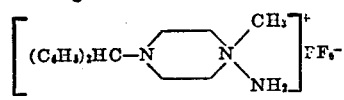

*Example IV*

Twenty-eight and one-half grams of chlorcyclizine, N - methyl - N' - p - chlorbenzhydrylpiperazine, the chloro analogue of cyclizine, was chloraminated in the same manner as cyclizine. As in the previous example, there was obtained on filtration (39.8 g., 17.2% Cl⁻) of mixed product and ammonium chloride and (5.6 g., 7.38% Cl⁻) additional crude product on evaporation of the filtrate. The combined solids were extracted with ether, taken up in isopropyl alcohol, filtered from undissolved material and the alcohol evaporated from the filtrate. The residue was dissolved in aqueous sodium carbonate, treated with activated charcoal, filtered and evaporated to dryness. The product was purified by crystallization from water-dioxane followed by recrystallization from isopropyl alcohol to get the hydroscopic white monohydrate melting about 106° C. and 138° C. Calculated for $C_{18}H_{23}N_3Cl_2 \cdot H_2O$: percent C, 58.3; percent H, 6.82; percent N, 11.3; and percent Cl, 19.2. Found for N-amino-N-methyl-N'-p-chlorbenzhydrylpiperazinium chloride monohydrate: percent C, 57.8; percent H, 7.0; percent N, 11.0; and percent Cl, 19.4.

*Examples V and VI*

Two 100 mg. portions of N-amino-N-methyl-N'-p-chlorbenzhydrylpiperazinium chloride (the product of Example IV) were dissolved in 10 ml. portions of water. Silver sulfate was added to the first solution and silver nitrate to the second (as 50 mg. of the silver salt dissolved in water). Both solutions were filtered from the resultant precipitate of silver chloride, the filtrates evaporated to dryness, the residues washed with chloroform and taken up in boiling isopropyl alcohol. There was obtained N - amino - N - methyl - N' - p - chlorbenzhydrylpiperazinium sulfate (M.P. 174–176° C.) and nitrate (M.P. ca. 144° C.) respectively. The nitrate was very hygroscopic and decomposed with the evolution of gas on heating near its melting point. The structural formula of the sulfate is given below:

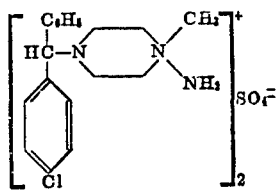

*Example VII*

The general method employed in the pharmacodynamic study of these compounds was as follows: Mongrel dogs of either sex were anesthetized by the intraperitoneal administration of 100 mg./kg. of phenobarbital sodium and surgery was supported with intravenous pentobarbital sodium. A carotid artery was cannulated and connected to a mercury manometer for recording blood pressure. A Pfeiffer cannula was inserted into the trachea and connected to a Marey tambour for recording respiration. The right vagus nerve was severed for recording the effects of peripheral and central electrical stimulation of the nerve. A femoral vein was exposed for the introduction of test materials. The blood pressure and respiration were recorded by ink-writing levers on a Gorrell and Gorrell kymograph. Blood pressure responses to acetylcholine chloride, Adrenalin chloride (epinephrine), Levophed (norepinephrine), nicotine salicylate and histamine phosphate were recorded at various times throughout the study. Electrical stimulation of the vagus was accomplished with a Grass stimulator.

*Example VIII*

Using the general method outlined in the previous example, N - amino - N - methyl - N' - p - chlorobenzhydrylpiperazinium chloride was dissolved in physiological saline at a concentration of 5 mg./ml. and administered to a male dog weighing 7.3 kg. Intravenous dose of 0.05, 0.25, 1.25 and 6.25 mg./kg. were given over a period of approximately five hours. Following dose of 0.25 mg./kg. and above, the compound produced immediate and profound falls in blood pressure of 24% to 76%. The blood pressure response was apparently dependent upon dosage and, in the case of the 6.25 mg./kg. dose, took as long as 45 minutes to return to pre-injection levels. There were no apparent changes in the blood pressure responses to Adrenalin, Levophed, acetylcholine or peripheral vagal stimulation during the study. The pressor response to nicotine was antagonized after the 0.5 mg./kg. dose and apparently abolished after the 125 mg./kg. dose. The animal was atropinized following the last dose of 6.25 mg./kg. and a ganglionic stimulant administered. The failure of the blood pressure to rise at this point indicated that the test compound possessed ganglionic blocking activity; this finding supports the apparent antagonism to the nicotine response. The depressor response to histamine was apparently antagonized following each dosage of the compound suggesting that the material possesses anti-histaminic activity. This latter point was confirmed by independent tests on isolated smooth muscle and broncho-constriction studies on guinea pigs.

*Example IX*

Using the general method outlined in Example VII, N-amino-N-methyl-N'-benzhydrylpiperazinium chloride was dissolved in physiological saline at concentrations of 1 and 20 mg./ml. and administered to a female dog weighing 8.1 kg. Intravenous doses of 0.05, 0.25, 1.25, 6.25, 12.5 and 25 mg./kg. were given over a period of approximately four hours. Slight but transient falls in blood pressure were observed following doses of 0.25 and 1.25 mg./kg. of the compound being tested. An injection of 6.25 mg./kg. caused an immediate and pronounced fall in blood pressure which was transitory in nature; respiratory depression occurred but it was transitory also. The pressor response to nicotine was markedly antagonized following the 1.25 mg./kg. dose and almost completely abolished after the 6.25 mg./kg. dose indicating a ganglionic depressant action of the test compound. In support of this possible ganglionic depressant action was the finding that the carotid pressor reflex was absent and that the opening of the palpebral fissure to the stimulation of the central vagus was partially inhibited. The dog was atropinized after the 12.5 mg./kg. dose and a ganglionic stimulant dose (0.2 mg./kg.) of acetylchloine failed to provoke a rise in blood pressure strongly supporting the compound's possible ganglionic blocking activity. The depressor response to histamine was markedly antagonized following the dose of 0.25 mg./kg. of test compound indicating anti-histamine activity. The anti-histaminic activity was confirmed by independent tests on isolated smooth muscle and bronchoconstriction studies on guinea pigs.

I claim:
1. Compounds having the formula:

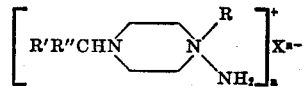

wherein R is selected from the group consisting of lower alkyl, lower allylic alkenyl and hydroxy lower alkyl; R' and R" are selected from the group consisting of phenyl, halo phenyl, lower alkyl phenyl and lower alkoxy phenyl; X is a pharmaceutically acceptable anion; and $n$ is an integer from one to three.

2. Compounds according to claim 1 wherein R is lower alkyl and R' and R" are phenyl.

3. Compounds according to claim 1 wherein R is lower alkyl, R' is phenyl and R" is halo phenyl.

4. As a new chemical compound, N-amino-N-methyl-N'-benzhydrylpiperazinium chloride.

5. N - amino - N - methyl - N' - benzhydrylpiperazinium picrate.

6. N - amino - N - methyl - N' - p - chlorbenzhydryl-piperazinium chloride.

7. N - amino - N - methyl - N' - p - chlorbenzhydryl-piperazinium nitrate.

8. N - amino - N - methyl - N' - p - chlorbenzhydryl-piperazinium sulfate.

References Cited in the file of this patent
UNITED STATES PATENTS 2,663,706   Conroy _____ Dec. 22, 1953
2,767,186   Baltzly et al. _____ Oct. 16, 1956